(Model.)

R. & F. ALDRED.
HARVESTER BINDER.

No. 365,561. Patented June 28, 1887.

Witnesses.
J. B. Fetherstonhaugh
H. H. Warren

Inventor.
Robert Aldred
Frederick Aldred
by Donald C. Ridout & Co
Attys (Model.)

R. & F. ALDRED.
HARVESTER BINDER.

No. 365,561.    Patented June 28, 1887.

(Model.)

R. & F. ALDRED.
HARVESTER BINDER.

No. 365,561.      Patented June 28, 1887.

Witnesses.
J. B. Fethustonhaugh
H. H. Warren

Inventors.
Robert Aldred
Frederick Aldred
by Donald C. Ridout & Co
Attys (Model.) 6 Sheets—Sheet 6.

R. & F. ALDRED.
HARVESTER BINDER.

No. 365,561. Patented June 28, 1887.

Witnesses.
J. B. Fetherstonhaugh
H. H. Warren

Inventors.
Robert Aldred
Frederick Aldred
by Donald C. Ridout & Co
Attys

UNITED STATES PATENT OFFICE.

ROBERT ALDRED AND FREDERICK ALDRED, OF GLENCOE, ONTARIO, CANADA.

HARVESTER-BINDER.

SPECIFICATION forming part of Letters Patent No. 365,561, dated June 28, 1887.

Application filed March 2, 1885. Renewed April 8, 1887. Serial No. 234,154. (Model.) Patented in England April 15, 1885, No. 4,657, and in Canada May 4, 1885, No. 21,580.

*To all whom it may concern:*

Be it known that we, ROBERT ALDRED and FREDERICK ALDRED, both manufacturers, of the village of Glencoe, in the county of Middlesex, in the Province of Ontario, Canada, have jointly invented certain new and useful Improvements in Harvester-Binders; and we do hereby declare that the following is a full, clear, and exact description of the same.

The object of the invention is to devise a simple harvester-binder possessing the combined advantages of a low-down and elevating binder, and also to arrange the binding mechanism in such a manner that it may be readily adapted and applied to an ordinary reaping-machine; and it consists, essentially, in attaching to the grain-table of a reaping-machine, at a point where the grain is usually discharged, a curved grain-receptacle, above which the binding mechanism is suspended, a circular moving elevating fork or forks being connected to and operated by the binding mechanism, so as to gather the sheaf from the grain-receptacle and elevate it to the binding mechanism, which is arranged and operates substantially in the manner hereinafter more particularly explained.

Fig. 7 is a perspective skeleton view of the mechanism for operating the needle-packers and harpoon-fork, showing them in their initial position. Fig. 7ª is a detail perspective on an enlarged scale.

In that class of harvester-binders commonly known as the "low-down" binder the sheaf is conveyed to the point where the band is placed around it exactly in the way that the grain falls onto the grain-table of the reaper— that is to say, part of it may be lying in one direction while the other parts are lying in other directions. Consequently the sheaf is in some classes of grain very imperfectly made. In the elevating-binder the grain is straightened by gravitation as the sheaf is raised on the elevating-canvas to the knotting mechanism.

In our improved harvester-binder we secure the advantage of the elevating-binder, while at the same time we obtain all of the many advantages of the low-down binder; and, moreover, our plan for connecting the binding mechanism to the reaping part of the machine is such that it can readily be adapted to and arranged upon an ordinary reaping-machine. With the view of facilitating the description of the component parts composing our improved harvester-binder, we will proceed to describe in detail the arrangement and operation of each combination of parts effecting the manipulation of the grain from the time it falls onto the grain-table until it is discharged from the machine properly bound into sheaves.

We may mention here that we use the ordinary rake for sweeping the grain off the grain-table A, and as the rakes we use operate in the same way as the rakes on ordinary reaping-machines it is not necessary to exhibit them in the drawings or to specifically describe them in the specification. It will be sufficient to say that when it is desired to sweep the grain off the grain-table A the rake is tripped into action in the ordinary way, and as soon as the sweeping-rake has performed its function it is thrown up in the ordinary way, and as it travels up on the ordinary cam-track, $a$, it comes into contact with the pivoted lever $b$ and moves the said lever, so as to put the entire binding mechanism into action, as hereinafter more particularly explained in detail.

Figure 1:
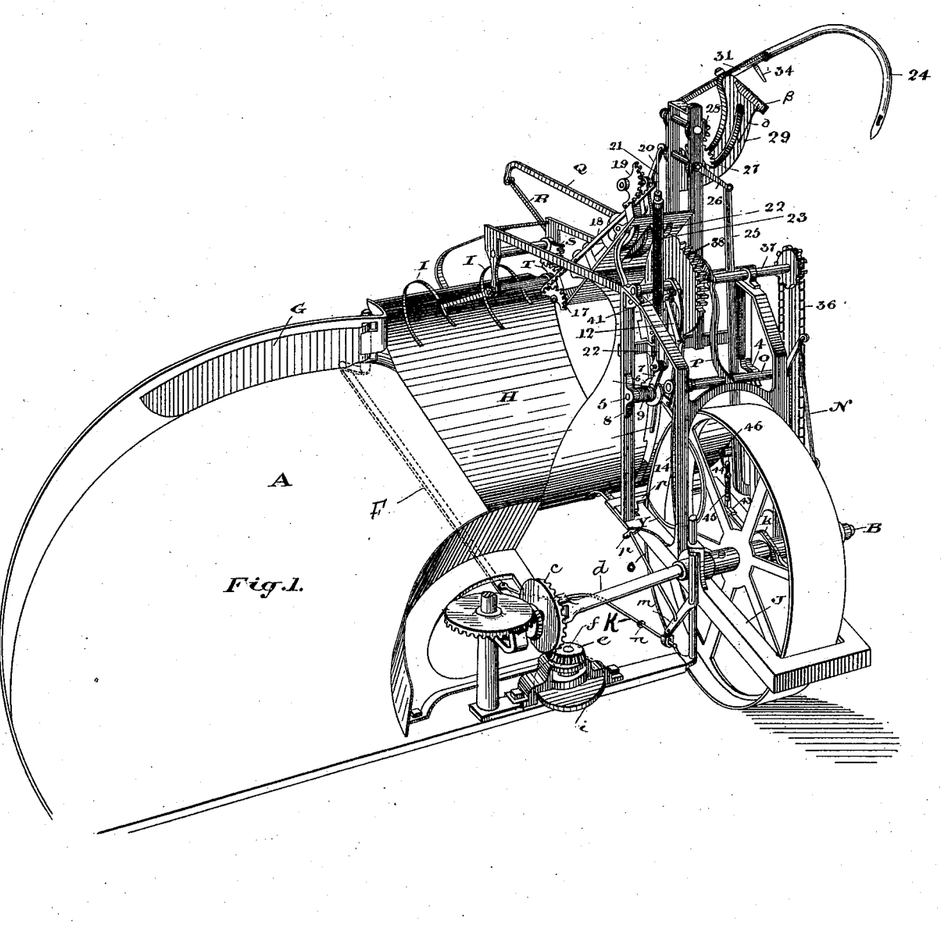
Figure 1 is a perspective view of my improved harvester-binder, looking from the grain-table side.
Figures 11, 14, 16, 17:
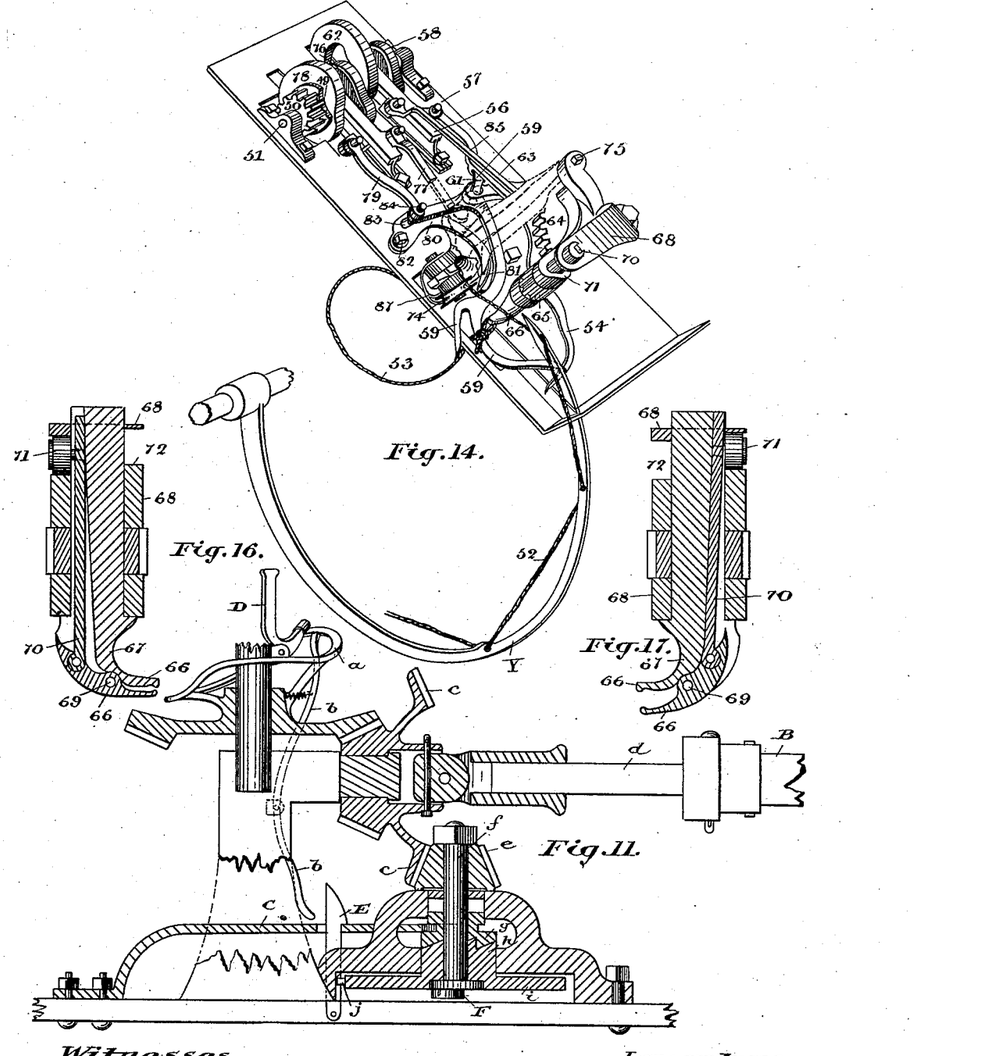
Fig. 11 is a sectional view showing the connection between the mechanism for driving the rakes and the mechanism for throwing the binding mechanism into action.
Fig. 14 is a perspective view of the same mechanism, showing its position at the period when the knot is just completed.
Fig. 16 is a detail of the knotter-bill closed.
Fig. 17 is a detail of the knotter-bill open to receive the cord.

To understand the first motion, it will be necessary to refer to Figs. 1 and 11, in which it will be found that the beveled gear $c$ is fastened upon the horizontal shaft $d$, which derives motion from the main driving-axle B. This beveled gear $c$ meshes with the beveled pinion $e$, which is attached to the vertical spindle $f$. The half-clutch $g$ works freely vertically upon the spindle $f$, but is prevented revolving thereon by a feather-key in the ordinary way. This half-clutch $g$ is arranged to mesh with its corresponding half-clutch, $h$, which revolves freely on the spindle $f$, and is attached to or forms part of the disk $i$, mounted loosely on the spindle $f$. In Fig. 11 the clutch $g\ h$ is shown connected. Consequently the motion of the gear $c$ is imparted to the disk $i$; but said disk stops immediately that the connection between the two halves of the clutch $g\ h$ is broken. During the period that the rake is sweeping the grain off the table A the clutch-half $g$ is held clear of the clutch-half $h$ by the spring-plate C. When the rake-arm D comes in contact with the lever $b$, it presses it over, causing its bottom end to press down upon the spring-plate C, which is connected, as indicated, to the clutch-half $g$, and brings it into gear with the clutch-half $h$, thereby imparting the motion of the machine to the disk $i$. When the plate C is pressed down to the position it is indicated in in Fig. 11, the hook or latch E springs over the plate and holds it down, as indicated. When the disk $i$ has made one revolution, a beveled projection, $j$, formed on its periphery, comes in contact with the latch E, throwing it clear of the plate C, the tendency of which is to spring up and carry the clutch-half $g$ out of gear with its fellow $h$, consequently causing the disk $i$ to stop.

On reference to Fig. 11, it will be noticed that a rod, F, is connected at one end to a crank-pin formed on the bottom of the disk $i$, and that its other end is connected to a crank formed on the bottom end of the pivoted spindle of the butter G. When the disk $i$ is caused to revolve, the butter G is turned on its pivot, so as to sweep the grain off the table A, and as this action is produced at the moment that the rake has left the grain it is sweeping from the table A, the butter G completes the motion, and, pushing against the stubble end of the grain, forces the gavel onto the curved grain-receptacle H, where it lies in a position to be acted upon by the elevating-forks I, which are in the position shown in Fig. 1 until this period, when they are thrown into action by the revolving mechanism, to understand which it will be necessary to refer to Figs. 1 and 2. A rod, K, is connected to the rod F and passes freely through a hole in the crank $m$, which is pivoted upon the frame J.

Figures 2, 3, 4, 5, 6:
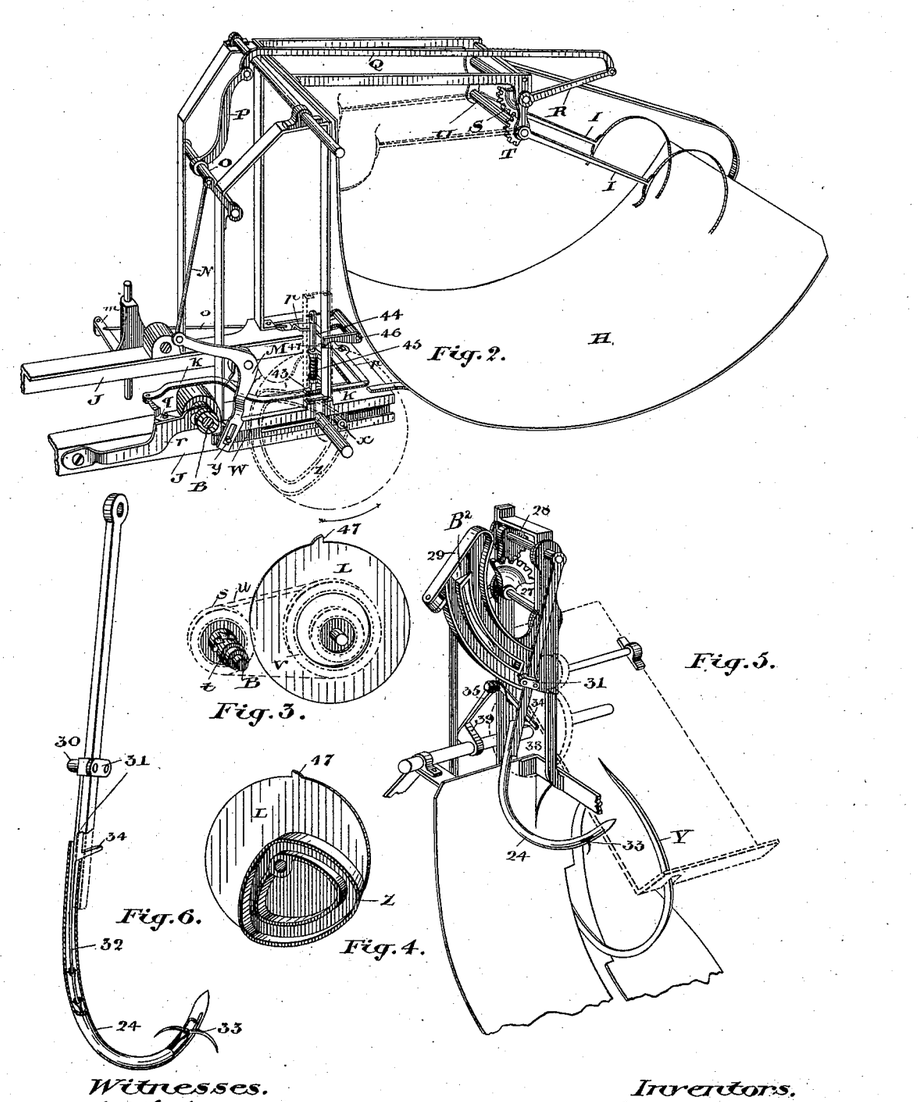
Fig. 2 is a skeleton perspective view of the mechanism for operating the elevating-forks.
Fig. 3 is a detail showing the outside of the clutch-pinion on the driving-wheel of the main axle and the cam-disk which operates all the binding mechanism.
Fig. 4 is a detail showing the cam on the inside face of the cam-disk exhibited in Fig. 3.
Fig. 5 is a perspective view showing a portion of the mechanism for operating the harpoon-fork.
Fig. 6 is an enlarged detail of the harpoon-fork.

A collar, $n$, is fixed to the rod K, so that it will come in contact with the crank $m$ at the period when the rod F has thrown the butter G the extreme distance that it is carried for the purpose of pushing off the grain from the table A. The pressure of the collar $n$ against the crank $m$ turns the said crank, and as this crank is connected by the rod $o$ to the lever $p$, which is pivoted upon the frame J, a corresponding rocking motion is imparted to this lever $p$, and its rocking movement is conveyed by the rod $k$ to the pivoted bell-crank lever $q$, the free end of which presses against the spring-plate $r$, which is connected to the hub of the sprocket-wheel $s$, which revolves freely on the main driving-axle B until its clutch-face is thrown into gear with the clutch $t$ (which is keyed to the axle B) by the outward movement of the spring-plate $r$. So soon as the sprocket-wheel $s$ is connected to the axle B the motion of the axle is imparted to the sprocket-wheel $s$, and as this sprocket-wheel is connected by the chain $u$ to the sprocket-wheel $v$, the motion of the axle B is conveyed to the cam-disk L, to which the sprocket-wheel $v$ is attached.

On reference to Fig. 2 it will be seen that a sliding plate, W, is held in a groove formed in the side of the frame J. Two friction-rollers, $x\ y$, are attached to studs extending from the sliding-plate $w$ at the opposite ends of the said plate. One friction-roller, $x$, is designed to fit into the cam $z$, formed on the inside surface of the cam-disk L. The other friction-roller, $y$, passes through a slot made in the bell-crank M, which is pivoted, as indicated, on a bracket attached to the frame J. The rod N connects the bell-crank M to the rock-shaft O, on which the arm P is fastened. The upper end of this arm P is connected by the rod Q to the lever R, attached to the segment-gear S, which meshes with the segment-gear T, attached to the shaft U, to which the forks I are attached. The cam $z$ is so shaped and arranged in connection with the friction-roller $x$ that while the cam-disk L is revolving the cam carries the friction-roller $x$ from the point it is shown in in Fig. 2 to the point it is indicated in in Fig. 7, and as the sliding plate $w$ must move with the friction-roller $x$, the bell-crank M is moved sufficiently to carry the forks I from the position they are shown in in full lines in Fig. 2 to the position they are indicated in in dotted lines in the same figure, in which position they hold the sheaf ready for the binding mechanism, which is at this period put into action.

Figures 7, 7A:
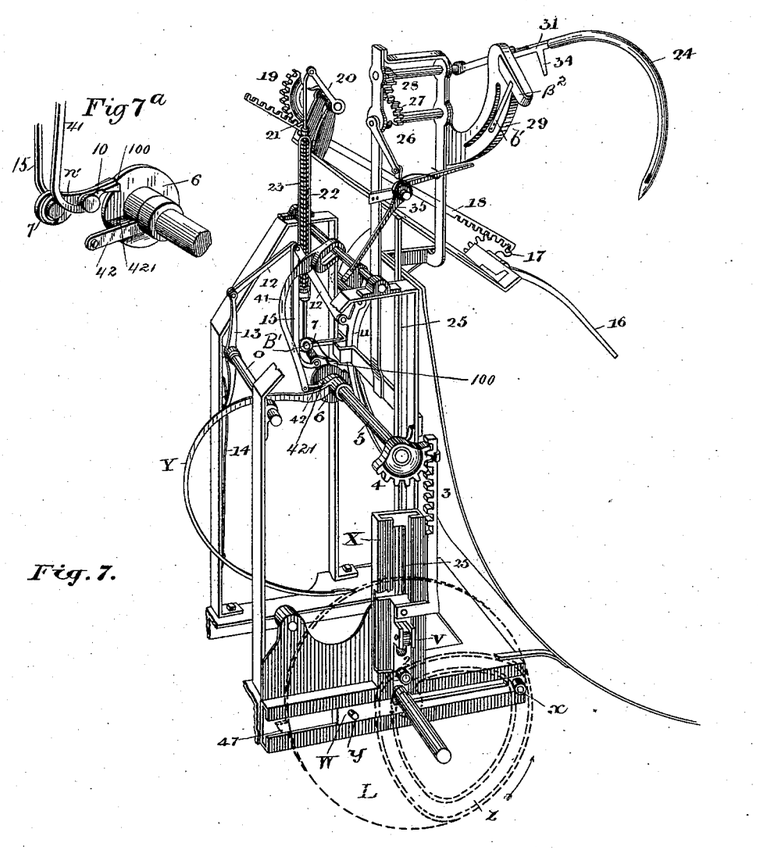
Figures 8, 9, 10:
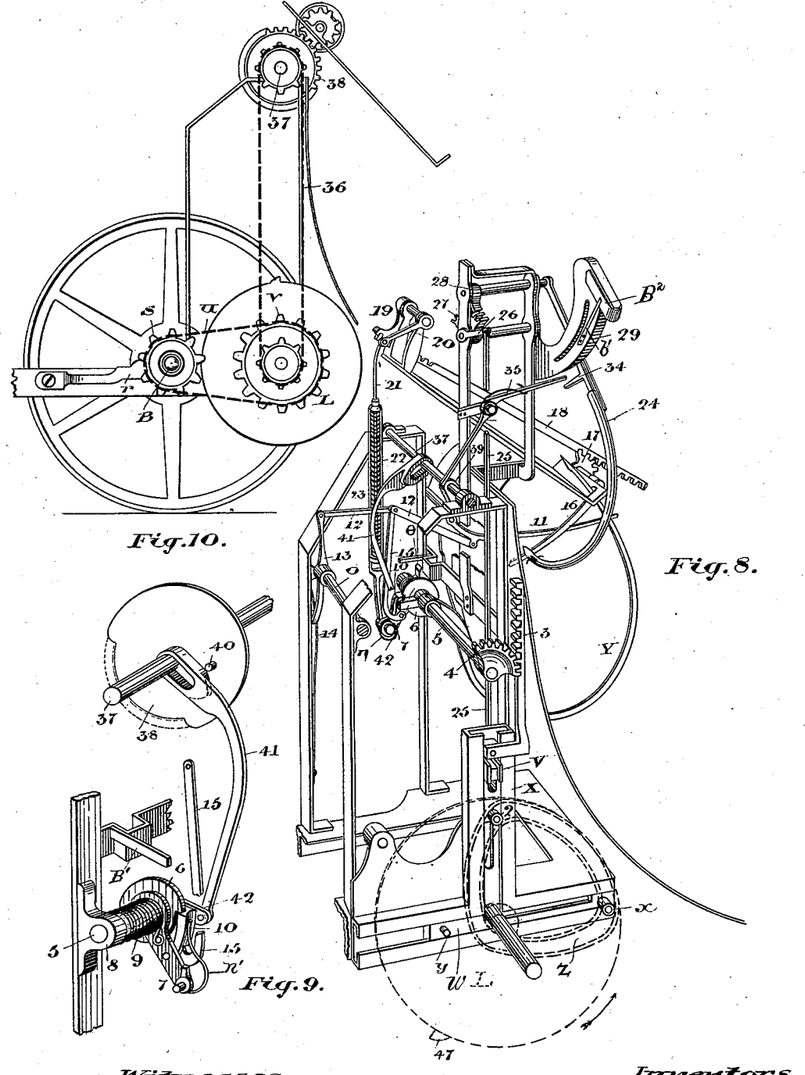
Fig. 8 is a similar view of the same parts, showing them in the position they assume during the tying of the knot.
Fig. 9 is a perspective detail of the trip mechanism for causing the packers to spring from the sheaf.
Fig. 10 is a side elevation of the gearing for conveying the motion of the rotating axle of the driving-wheel to the cam for operating the main cam and knotting mechanism.

It will be noticed on reference to Fig. 7 that owing to the shape of the cam $z$ friction-roller $x$ remains stationary during the period that the cam travels from the point it is shown in in Fig. 7 to the point it is indicated in in Fig. 8, which period is the time that the binding mechanism is operating, to understand which it will be necessary to refer to Figs. 7 and 8. A sliding plate or head, V, is fitted into and works within a vertical groove or guide, X, formed on the main frame of the machine. A friction-roller, 2, is attached to the sliding plate V, and fits into the cam $z$, which imparts to the said plate a vertical reciprocating motion. A rack-bar, 3, is attached to the sliding plate V, and meshes with the segment-gear 4, which is attached to the horizontal shaft 5, to which the needle Y is fastened and by which the compressors are put into action, as we shall now proceed to describe in detail, and will refer to Figs. 7, 8, and 9 for the purpose of the description.

A notched disk, 6, is keyed to the shaft 5, while the arm 7 is fitted loosely onto the said shaft, but is connected to the bearing-lug 8 by the spiral spring 9, one end of the said spiral spring 9 being connected to the arm 7, while its other end is connected to the bearing-lug 8, and the said spring is set so as to impart an upward movement to the arm 7. A dog, 10, is pivoted on the arm 7, and is arranged to engage with a notch made in the disk 6 by means of the spring $n'$.

11 is the front compressor pivoted on the frame of the machine and connected by the toggle-jointed bars 12 to the pivoted arm 13, the bottom end of which fits below the spring-plate 14. The center joints of the bars 12 are connected to the arm 7 by the rod 15, so that the downward movement of the arm 7 shall, by straightening the toggle-jointed bars 12, cause the front compressor, 11, to move from the position it is indicated in in Fig. 7 to the position it is shown in in Fig. 8 for the purpose of compressing the front side of the bundle about to be bound. The back compressor, 16, is attached to a spindle, on which the segment gear 17 is fastened. This segment-gear 17 meshes with the rack-bar 18, the opposite end of which meshes with the segment-gear 19, which is attached to the spindle on which the arm 20 is fastened. On the end of this arm 20 we connect a rod, 21, which passes through a hole in the forked end 22, the lower end of which is connected to the arm 7.

A spiral spring, 23, fits between a collar on the bottom end of the rod 21 and the top of the forked rod 22, so as to form a longitudinal elastic connection between the arm 7 and the arm 20, in order that the compressor 16 may be permitted to yield slightly in the event of a larger gavel than usual being collected.

B' is a stop formed on the frame, against which the arm 7 strikes, thus regulating the sweep of the compressor-arm 16, as indicated in Fig. 7. The spring-plate 14, which is arranged as before described, is intended for the purpose of permitting the same elastic action for the front compressor, 11. When the horizontal shaft 5 is caused to rock in its bearing by the action of the rack-bar 3 and segment-gear 4, operated by the cam $z$, as hereinbefore described, the motion of the said shaft moves the needle up into the knotting mechanism, and at the same time the notched disk 6 actuates, through the dog 10, the arm 7, which conveys, as before described, the necessary motion to the compressors 11 and 16. Simultaneously with the action of the mechanism just described, the harpoon-fork 24 is brought into action by the upward motion of the sliding plate V, which is connected by the rod 25 to the arm 26, connected to the harpoon-fork 24 by the segment-gears 27 and 28, as indicated. The action of this harpoon-fork may here be described. While the friction-roller 2 is being pushed up by the action of the cam-disk L from the position it is shown in in Fig. 7 to the position it is indicated in in Fig. 8, the harpoon-fork 24 is moved from the position it is indicated in in Fig. 7 to that in which it is shown in Fig. 8, the former position being clear of the bundle, while in the latter position it is forced into the end of the bundle held during the process of binding. The bracket 29 is grooved, as indicated in Fig. 5, to receive a friction-roller, 30, attached to a slide, 31, fitted upon the harpoon-fork 24. This slide 31 is connected by the jointed rod 32 to the harpoon-points 33, as indicated in Fig. 6, so that the upward movement of the slide 31 causes the harpoon-point 33 to recede into the fork, while the downward movement of the slide 31 forces the harpoon point 33 out into the position indicated in Fig. 6.

B² is a gate pivoted on the end of the bracket 29 and kept in position by the spring $b'$, the gate B² being on an incline, and when the friction-roller 30 passes the incline it drops down into the groove again, being prevented by the form of the gate B², as shown in Fig. 5, from receding into the lower groove.

34 is a finger attached to the slide 31.

35 is a bell-crank pivoted in the frame of the machine and having one of its arms projecting beyond the bracket 29. The chain 36 (seen in Fig. 10) conveys motion to the shaft 37. On this shaft is fastened the segment-gear 38, from which the knotting mechanism derives its motion, as hereinafter described. A cam, 39, is also fastened to the shaft 37, and is located in front of one of the arms of the bell-crank 35. At the time that the harpoon-fork 24 is forced into the end of the bundle, hereinbefore referred to, the cam 39 has been brought by the motion of the shaft 37 to a point which will cause the bell-crank 35 to tilt, and as at that time the finger 34 is below the bell-crank, and the friction-roller 30 is at the lower end of the bracket 29, the said tilting of the bell-crank 35 forces the friction-roller 30 from the upper to the lower groove made in the bracket 29, carrying it down to the position it is indicated in in Fig. 5. By thus pressing down the friction-roller 30 the harpoon-points 33 are forced out from the fork, thereby forming a connection between the fork and the bundle. By the time that this action is performed the tying of the bundle has been effected and the bundle is ready to be discharged from the machine.

On reference to Fig. 9 it will be seen that on the face of the segment-gear 38 is placed a pin, 40, arranged to come in contact with the hub formed on the rod 41, the loop end of the said rod fitting over the shaft 37, while its lower end is connected to an arm, 42, having a projection, 42¹, to fit below the projection 100 on the pawl 10. (See Fig. 7ª.) When the pin 40 has raised the rod 41 sufficiently to force the dog 10 out of gear with the notched disk 6, the arm 7 is released and is carried upwardly by the action of the spring 9, thereby causing the compressors to spring away from the bundle. The downward movement of the friction-roller 2 carries the needle away from the bundle, and at the same time the harpoon-fork is carried back to the position it is indicated in in Fig. 7, carrying with it the bundle, the stubble end of which hangs downwardly. When the friction-roller 30 reaches the top end of the bracket 29, it is, by the form of the groove in the said bracket, drawn upwardly on the fork 24, which action, as before described, causes the harpoon-points 33 to recede into the fork, thereby releasing the bundle and permitting it to drop to the ground, where it falls on the stubble end without injuring the sheaf. By the time that all these motions described have been accomplished the cam-wheel L has made a complete revolution, and the connection between the binding mechanism and main driving-axle is broken in the following manner:

On reference to Fig. 2 it will be seen that the rod K has a shoulder, 43, placed on its top side, and that a plunger, 44, rests upon the said shoulder. This plunger is actuated by a spring, 45, which presses the said plunger down, and when the rod k is moved, as described in the commencement of this specification, the shoulder 43 passes the plunger, and the spring forces the plunger down behind the shoulder 43, which action secures the rod k, and causes it to hold the clutch t in gear, so as to connect the binding mechanism with the axle B, as hereinbefore described.

46 is a rock-shaft, one arm on which is connected to the plunger 44, while the other arm projects over the periphery of the cam-disk L, upon which is formed a wedge-shaped projection, 47. By the time that the cam-disk L has made a complete revolution, as before explained, the wedge-shaped projection 47 passes below the arm of the rock-shaft 46, causing the said rock-shaft to move, so as to raise the plunger 44 clear of the shoulder 43, thereby releasing the rod K and permitting the spring r to carry the clutch out of gear, where it remains until again put into action, as described at the commencement of this specification.

Having now described the mechanism by which the bundle is gathered and held during the operation of tying, we shall proceed to explain the construction and operation of our knotting mechanism, and refer to Figs. 12, 13, 14, 15, 16, 17, 18, and 19, which exhibit the mechanism constituting the knotter.

Figures 12, 13, 15:
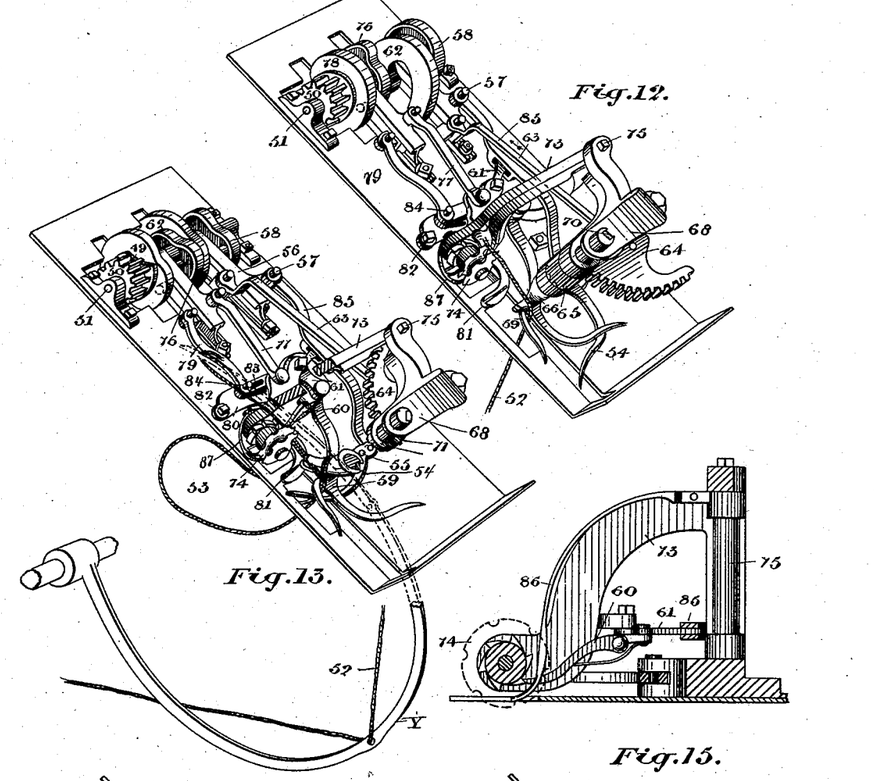
Fig. 12 is a perspective view of the knotting mechanism in its initial position.
Fig. 13 is a perspective view of the same mechanism, showing its arrangement at the period when the knotter-bill has made about three-fourths of its revolution.
Fig. 15 is a detail of the mechanism for operating the cord-holder.
Figure 18:
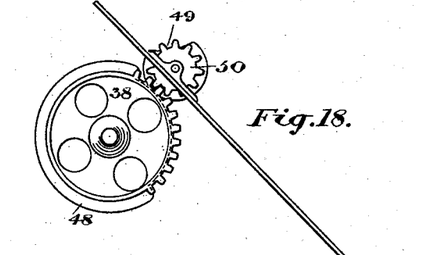
Figs. 18 and 19 are details of the mutilated gear for operating the knotting mechanism.
Figure 19:
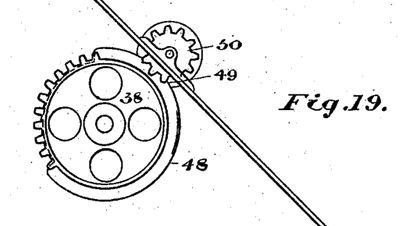

Segment-gear 38, which derives motion from the main axle B of the machine, as before described, has a delay-rim, 48, for about three-fourths of its circumference. This rim fits into a circular delay-shoe, 49, formed behind the teeth of the spur-pinion 50. This pinion 50 is keyed or otherwise fastened to the shaft or spindle 51, upon which the cams for operating the knotting mechanism are attached. During the period that the rim 48 fits into the recess 49 the knotting mechanism remains stationary; but as soon as the teeth on the segment-wheel 38 come in contact with the teeth of the pinion 50 the said pinion is caused to revolve and the mechanism is thus put into action, there being just sufficient teeth in the segment-wheel 38 to cause the pinion 50 to make one revolution, which revolution is sufficient to perform the entire knotting operation. By the time that the teeth have passed the pinion 50 the recess 49 has once more come opposite to the wheel 38, and the rim 48 once more enters the recess, thereby holding the pinion 50 perfectly stationary and the mechanism in its initial position, as indicated in Fig. 12. When the needle is thrown up into the knotting mechanism, as shown by dotted lines in Fig. 13, the cord 52 encircles the bundle which would be held within the loop we have marked 53 in Figs. 13 and 14.

The tucker 54 is pivoted at 55, and is connected by the rod 85 to a pin, 57, attached to a slide fitting in the guide-block 56. The other end of this slide has a pin which fits into a cam-groove formed in the cam 58. Neither the pin nor the slide is seen in the drawings; but it is not necessary that they should be, as any one will understand how to connect the cam 58 to the end of the rod forming part of the tucker 54 in order that the revolving of the cam 58 shall impart a reciprocating movement to the tucker. When the teeth of the wheel 38 first mesh with the pinion 50, the cam 58 is first brought into action, causing the tucker 54 to move from the position in which it is indicated in Fig. 12 to the position in which it is shown in Fig. 13, which action tucks the cord 52 into the recess of the stripper 59. Simultaneously with the movement of the tucker 54 the cord-holder, into one notch of which the cord has just been deposited by the needle, is caused to revolve by the action of the ratchet-pawl 60, which is connected, as indicated in Fig. 15, to the bell-crank 61, the opposite end of which is connected to the rod 85 of the tucker 54, and by so revolving compresses the cord against the spring 86 on the pivoted arm 73, thus holding the cord securely in position during the process of tying the knot. 87 is a spring-fork pivoted on the spindle of the cord-holder, and arranged to keep the holder clear from the fibers of the cord. When the cam 58 has revolved, so as to bring the tucker 54 from the position it is shown in in Fig. 12 to the position in which it is shown in Fig. 13, the shape of the cam then acting on the pin of the slide, before referred to, is such that the mechanism connected therewith remains stationary, although the cam continues to revolve. When the tucker ceases to move, cam 62 begins to move the rod 63 in the direction indicated by arrow, and as the opposite end of this rod 63 is connected to the quadrant-rack 64 the said quadrant-rack is moved from the position in which it is shown in Fig. 12 to that in which it is indicated in Fig. 13, and as this rack 64 meshes with the teeth 65, connected to the knotter-bill 66, the said knotter-bill is made to make one revolution. By the time it has reached the position in which it is indicated in Fig. 13 the jaws are opened and closed, so as to grip the cord 52. With the view of understanding this action we would refer to Figs. 16 and 17, in which the construction of the knotter-bill is exhibited. The upper jaw of the knotter-bill forms part of the spindle 67, which passes through suitable bearings formed in the bracket 68.

The lower jaw of the knotter-bill 66 is pivoted at 69 to the upper jaw, and its back is connected to the rod 70, which fits into a groove made in the spindle 67. On the upper end of this rod 70 I place a friction-roller, 71, which fits on a cam-track, 72, formed in the bracket 68. When the spindle 67 of the knotter-bill is caused to revolve by the action of the quadrant-rack 64, the friction-roller 71 mounts a high point on the said track just before the knotter-bill 66 has reached the cord 52, thus causing the lower jaw of the knotter-bill to change from the position in which it is indicated in Fig. 16 to the position in which it is shown in Fig. 17. By the time the cord 52 has entered the jaws of the knotter-bill 66 the high portion of the track 72 has been passed, and the jaws of the knotter-bill closed so as to grip the cord, which it holds until withdrawn from it by the movement of the stripper 59. The arm 73, which carries the cord-holder 74, is pivoted at 75, and is connected to the cam 76 by the pivoted rod 77. The shape of the cam 76 is such that at the time that the knotter-bill 66 has reached the position in which it is indicated in Fig. 13 the pivoted arm 73 is permitted to fall from the position in which it is shown in Fig. 13 to the position in which it is indicated in Fig. 14, which movement loosens the cord and gives sufficient slack to allow the cord 52 to pass through the loop formed around the knotter-bill when the stripper 59 is moved from the position in which it is shown in Fig. 13 to the position in which it is indicated in Fig. 14, which motion is effected by the action of the cam 78, which is connected to the stripper by the rod 79. The plate 80, on which the knife 81 is formed, is pivoted at 82, and has a slot, 83, made in it to receive the end of the pin 84, which connects the rod 79 to the plate 80, and also to the stripper 59. When the stripper is moved by the action of the cam 78, the knife-plate 80 is moved so as to cause the knife 81 to pass between the knotter-bill 66 and cord-holder 74, thereby cutting the cord at that point just as the stripper 59 is about to pull the cord off the knotter-bill. By the time that this is accomplished the recess 49 has once more come opposite to the plain rim 48, and the shaft 51 remains stationary, holding the knotting mechanism in its initial position until the next knot is required.

What we claim as our invention is—

1. In a harvester-binder in which the grain-receptacle is located substantially in the same plane as the grain-table of the harvester, the combination of a curved hinged butter, G, pivoted at one corner of said table and arranged to come in contact with the stubble ends of the grain and assist in sweeping it from the grain-table onto the grain-receptacle, and a rod, F, connecting the said spindle of said butter with the disk $i$, substantially as and for the purpose specified.

2. In a harvester-binder in which the grain is swept from the grain-table A by the action of the rakes, the pivoted lever $b$, having one end in a line with the track of the arm D and its other end in proximity to a spring-plate, C, so that when the rake-arm D shall come in contact with the pivoted lever $b$ the spring-plate C shall be pressed downwardly, so as to throw clutch mechanism into action, by which the motion of the revolving axle is communicated to gearing leading to the binding mechanism.

3. The beveled gear $c$, fastened to the horizontal spindle $d$, which derives motion from the main driving-axle B, the beveled pinion $e$, meshing with the gear $c$ and attached to the spindle $f$, and the half clutch $g$, secured, as specified, on the spindle $f$ and arranged to mesh with its corresponding half-clutch, $h$, which revolves freely on the spindle $f$ and is attached to or forms part of the disk $i$, in combination with a spring-plate, C, connected to the clutch $g$, the pivoted lever $b$, and latch E, arranged substantially as and for the purpose specified.

4. The disk $i$, deriving motion as specified, a rod, F, connected at one end to the crank-pin on the disk $i$ and at its other end to a crank formed on the bottom end of the spindle of the pivoted butter G, the plate C, and latch E, in combination with a projection, $j$, formed on the periphery of the disk $i$, for the purpose of releasing the latch E, substantially as and for the purpose specified.

5. A rod, K, connected at one end to the rod F, and passing freely through a hole in the crank $m$, which is pivoted upon the frame J, and a collar, n, fixed to the rod K, as specified, in combination with the rod o, arranged to connect the crank m to the lever p, pivoted on the frame J, and connected by the rod k to the pivoted rod q, the free end of which presses against the spring-plate r, arranged to operate substantially as and for the purpose specified.

6. The sprocket-wheel s, revolving loosely on the axle B, and the sprocket-wheel v, combined with the chain U, connecting said wheels, cam-disk L, connected to the wheel v, the clutch t on the wheel s, and the spring-plate r, connected to the hub of the wheel s, substantially as and for the purpose specified.

7. A sliding plate, W, held in a groove formed in the side of the frame J, and a friction-roller, x, fitted into the cam z, formed on the inside surface of the cam-disk L, in combination with the friction-roller y, also attached to the sliding plate W, but passing through a slot made in the pivoted bell-crank M, substantially as and for the purpose specified.

8. The rod N, connected at one end to the bell-crank M and at its other end to the rock-shaft O, on which the arm P is fastened, in combination with the rod Q, arranged to connect the arm P to the lever R, which is attached to the segment-gear S, meshing with the segment-gear T, attached to the shaft U, to which the elevating-forks I are fastened, substantially as and for the purpose specified.

9. A sliding plate or head, V, working within a vertical groove or guide, X, formed in the main frame of the machine, and a pin, 2, attached to the head V, in combination with the sliding plate W, carrying friction-roller x, and the cam z, into which the friction-rollers on the two plates enter, substantially as and for the purpose specified.

10. The combination, with the compressor and the main frame of the machine, having vertical guide X, of the head V, sliding vertically in said guide, the rack-bar 3, attached to said head, and the horizontal shaft 5, to which the needle is directly secured, carrying segment-rack 4, meshing with the rack-bar 3, the notched disk 6, secured to the shaft 5, the arm 7, spring 9, and dog 10, all arranged and operating substantially as and for the purposes described.

11. A notched disk, 6, keyed to the shaft 5, in combination with an arm, 7, fitted loosely onto the said shaft 5, a dog, 10, pivoted on the arm 7, and a spiral spring, 9, arranged to connect the arm 7 to the bearing-box 8, substantially as and for the purpose specified.

12. The compressor 11, pivoted on the frame of the machine, and connected by the toggle-jointed bars 12 to the pivoted arm 13, the bottom end of which fits below the spring-plate 14, in combination with a rod, 15, arranged to connect the joint of the bars 12 to the arm 7, substantially as and for the purpose specified.

13. The compressor 16, attached to a spindle on which the segment-gear 17 is fastened, which segment-gear meshes with a rack on the rod 18, the opposite end of which meshes with the segment-gear 19, which is attached to the spindle on which the arm 20 is fastened, in combination with a rod, 21, passing through a hole in the forked rod 22, the lower end of which is connected to the arm 7, a spiral spring, 23, the whole being arranged and operated substantially as and for the purpose specified.

14. The combination, with the arm 7, of a stop, B', substantially as and for the purpose specified.

15. The rod 25, connected at one end to the sliding plate V and at its other end to the arm 26, in combination with the pivoted harpoon-fork 24, connected to the arm 26 by the segment-gears 27 and 28.

16. The grooved bracket 29, arranged to receive the friction-roller 30, attached to a slide, 31, on the harpoon-fork 24, in combination with the jointed rod 32, arranged to connect the slide 31 to the harpoon-points 33, substantially as and for the purpose specified.

17. The grooved bracket 29, holding the friction-roller 30, which is attached to the slide 31, as specified, in combination with the pivoted gate B², actuated by the spring b', arranged substantially as and for the purpose specified.

18. A finger, 34, attached to the slide 31, and projecting below a pivoted bell-crank, 35, in combination with a cam, 39, fixed to the shaft 37, and arranged to actuate the bell-crank 35, substantially as and for the purpose specified.

19. The rod 41, connected to an arm, 42, having a projection to fit below the dog 10, and having a projecting slotted hub fitting over the shaft 37, in combination with the pin 40, placed in the face of the segment-gear 38, and arranged to operate the rod 41, substantially as and for the purpose specified.

20. The plunger 44, actuated by the spring 45, and arranged to fit behind the shoulder 43 on the rod K, in combination with a rock-shaft, 46, one arm of which is connected to the plunger 44 and its other arm projecting over the periphery of the cam-disk L, upon which the wedge-shaped projection 47 is formed, substantially as and for the purpose specified.

21. The tucker 54, pivoted at 55, and connected by the rod 85 to the pin 57, attached to a slide fitting in the guide-block 56, in combination with a cam, 58, arranged to operate the slide, substantially as and for the purpose specified.

22. The bell-crank 61, connected at one end to the pawl 60 and at its other end to the rod 85 of the tucker 54, in combination with the cord-holder 74 and spring 86, substantially as and for the purpose specified.

23. The combination, with the cord-holder 74, of the bifurcated spring-fork 87, pivoted on the spindle of the cord-holder and bearing against said holder, and whereby it is adapted to keep the holder clear from the fibers of the cord.

24. The knotter-bill 66, the upper jaw of which is solid with the spindle 67, while the lower jaw is pivoted at 69 to the spindle 67, and connected to the rod 70, which fits into the groove made in the spindle 67, in combination with the bracket 68, having cam-track 72, and a friction-roller, 71, carried by said rod and fitting on the cam-track 72, formed in the bracket 68, substantially as and for the purpose specified.

25. The pivoted stripper 59, in combination with the knife-carrying plate 80, the cam 78, and the rod 79, connected to said plate and to said stripper, substantially as and for the purpose specified.

26. The plate 80, on which the knife 81 is formed, pivoted at 82, and having a slot, 83, made in it to receive the end of the pin 84, in combination with the rod 79, actuated by the cam 78, substantially as and for the purpose specified.

Dated the 21st day of February, A. D. 1885.

ROBERT ALDRED.
FREDERICK ALDRED.

In presence of—
H. S. BLACKBURN,
STEPHEN MACKLENN.